United States Patent [19]

Strand et al.

[11] Patent Number: 5,340,478

[45] Date of Patent: * Aug. 23, 1994

[54] DUAL CHAMBER WATER FILTER

[75] Inventors: Charles D. Strand, Arlington; Anthony B. Meehon, Mansfield, both of Tex.

[73] Assignee: International Purity Corp., Arlington, Tex.

[ * ] Notice: The portion of the term of this patent subsequent to Aug. 20, 2008 has been disclaimed.

[21] Appl. No.: 936,095

[22] Filed: Aug. 26, 1992

Related U.S. Application Data

[63] Continuation-in-part of Ser. No. 917,006, Aug. 7, 1992, abandoned.

[51] Int. Cl.⁵ ............................................. B01D 24/18
[52] U.S. Cl. ................................. 210/284; 210/286; 210/440; 210/443
[58] Field of Search ............... 210/263, 264, 266, 284, 210/285, 286, 287, 288, 440, 443, 493.2

[56] References Cited

U.S. PATENT DOCUMENTS

| | | | |
|---|---|---|---|
| 93,339 | 8/1869 | Parrot | 210/286 |
| D. 296,463 | 6/1988 | Padilla | D23/209 |
| 342,151 | 5/1886 | Walls | 210/284 |
| 2,101,961 | 12/1937 | Slidell | 210/164 |
| 4,561,974 | 12/1985 | Bernard et al. | |
| 4,561,976 | 12/1985 | Houser | |
| 4,561,979 | 12/1985 | Harris et al. | 210/438 |
| 4,642,192 | 2/1987 | Nesbitt | 210/638 |
| 4,714,546 | 12/1987 | Salomon et al. | 210/137 |
| 4,747,945 | 5/1988 | Kreusch et al. | 210/290 |
| 5,017,286 | 5/1991 | Heiligman | 210/266 |

Primary Examiner—Robert A. Dawson
Assistant Examiner—W. L. Walker
Attorney, Agent, or Firm—Daniel V. Thompson

[57] ABSTRACT

A liquid filter has a housing with a bottom and a top. A vertical partition divides the housing into an inlet chamber and an outlet chamber. One type of filtration material is located in the inlet chamber. The inlet to the inlet chamber is located in the bottom of the housing and results in an upward flow through the inlet chamber. The outlet chamber has an outlet located in the bottom of the housing. A port is located at the top of the inlet chamber for directing the liquid from the inlet chamber into the outlet chamber. The liquid flows downwardly through the outlet chamber.

8 Claims, 4 Drawing Sheets

DUAL CHAMBER WATER FILTER

CROSS REFERENCE TO RELATED APPLICATIONS

This is a continuation-in-part of co-pending application Ser. No. 07/917,006 (formerly PCT/US91/00930), filed Aug. 7, 1992; now abandoned.

TECHNICAL FIELD

This invention relates in general to water filters, and in particular to a filter that has chambers containing separate filtration materials.

BACKGROUND ART

Many households use water filters to remove impurities from water. Typically these filters connect to a kitchen sink faucet. One type of filtration material comprises activated granulated charcoal. Charcoal removes organic materials and various solids. Another type of filtration material employed is a metallic particulate. The metal particles remove inorganic materials through an ion exchange.

Previously, when a filtration system utilized both of these materials, they have been enclosed in either separate containers or in the same container. When they are in the same container, the two separate filtration materials are placed in a single chamber in contact with each other. Coming into direct contact with each other may have a detrimental effect on the operating efficiency and life expectancy.

Also, the flow of the liquid proceeds in the same direction through each filtration material when they are both in the same chamber. the disadvantage to this is that the charcoal material works best in a condition where the flow is downward. This compacts the materials. The metallic particulate works best in an upflow condition with the flow reducing compaction.

When these materials are enclosed in separate containers, the flow direction and compaction can be controlled for each one. This provides for an optimum design, but it increases the cost and size in a point-of-use, household filtration unit.

DISCLOSURE OF THE INVENTION

The filter of this invention has a housing with a bottom and a top. A vertical partition divides the housing into an inlet chamber and an outlet chamber. A first filtration media is located in the inlet chamber and a second filtration media is located in the outlet chamber. Inlet means is located in the bottom of the housing for receiving liquid to be filtered and for causing the liquid to flow upwardly through the first filtration particulate so as to reduce compaction thereof. Port means is located in the partition adjacent the top of the housing, for causing liquid flowing upwardly through the inlet chamber to flow from the inlet chamber into the outlet chamber. Outlet means is located in the bottom of the housing in the outlet chamber, for causing liquid flowing into the outlet chamber from the inlet chamber to flow downwardly through the second filtration media so as to increase compaction of the second filtration media and out of housing.

In one embodiment, the inlet chamber is in co-axial relationship with the outlet chamber, with the outlet chamber surrounding the inlet chamber. In accordance with a unique feature of the invention, the port means includes means for directing liquid flowing through the port means radially outward from the inlet chamber into the outlet chamber.

In the preferred embodiment, the first filtration media includes a metallic particulate for removing inorganic particles in the liquid by ion exchange. The second filtration media preferably includes charcoal. A third filtration media is preferably located in the outlet chamber adjacent the bottom of the housing. The third filtration media includes sorbent media for reducing metals dissolved in the liquid.

BEST MODE FOR CARRYING OUT THE INVENTION

Figure 1:
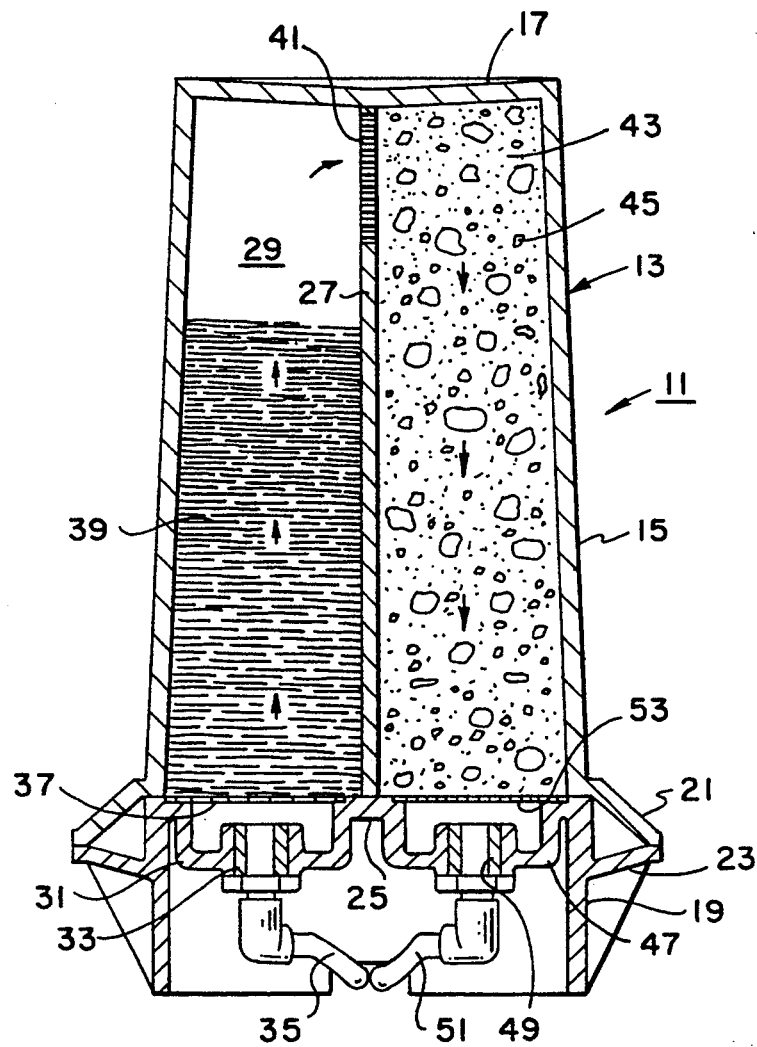
FIG. 1 is a vertical sectional view of a filter constructed in accordance with this invention.

Referring to FIG. 1, filter 11 has a housing 13. The housing 13 is a truncated cone. The side walls 15 are conical, tapering from a larger diameter at the bottom to a smaller diameter at the upper end. The housing has a top 17 that encloses the upper end of the side walls 15. A base 19 locates at the lower end of the housing 13. A flange 21 extends downward and outward from the lower end of the side walls 15. A flange 23 extends upward and outward from the base 19. The flanges 21, 23 are sonically welded together to secure the base 19 to the housing 13. The base 19 thus becomes a part of the housing 13.

Figure 2:
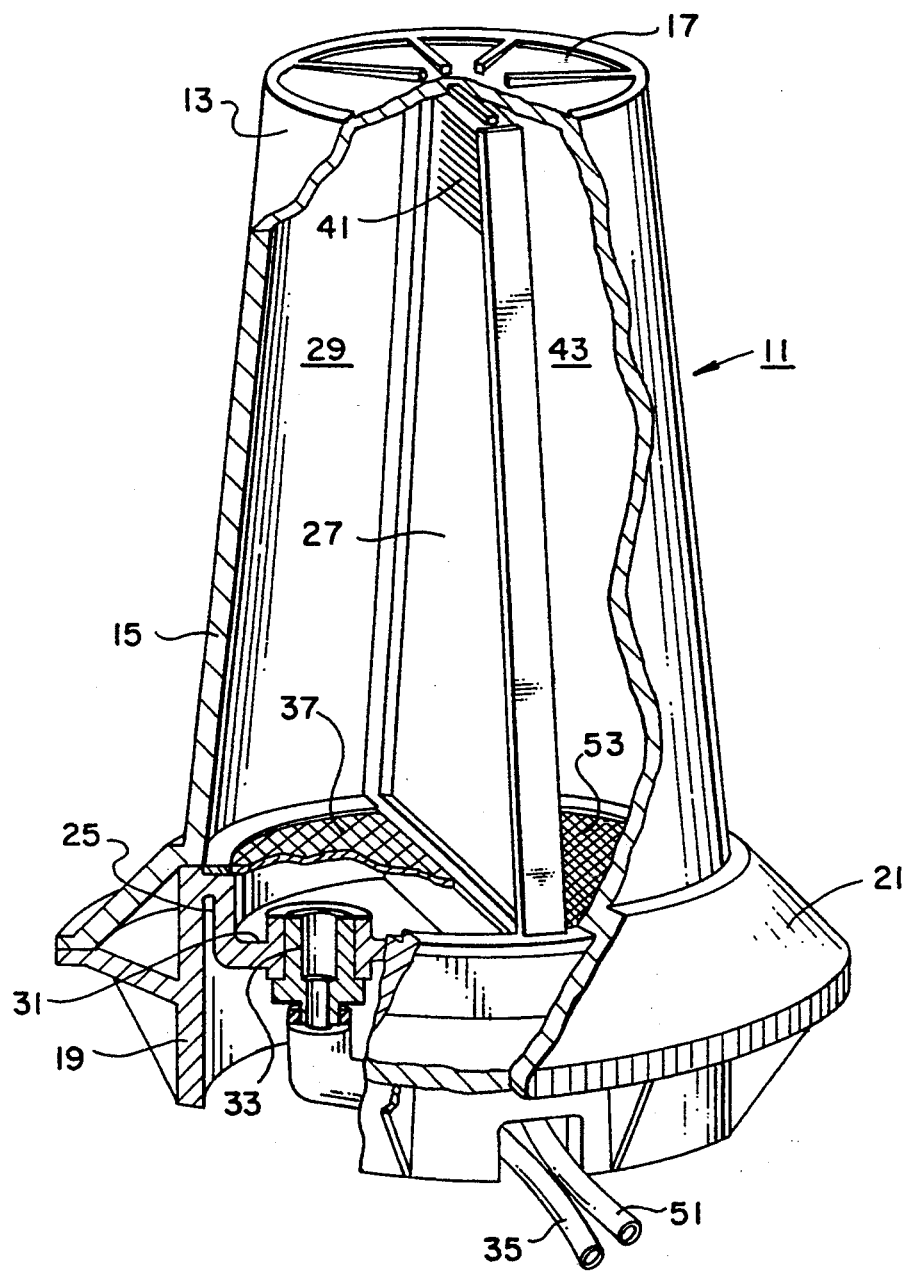
FIG. 2 is a perspective view of the filter of FIG. 1, with portions broken away to show the interior.

Base 19 has a top 25 which becomes the bottom of the housing 13. A partition 27 extends vertically upward from the base top 25 to the housing top 17. Partition 27 is a flat wall. An inlet chamber 29 will be located on one side of the partition 27. The inlet chamber 29 comprises the entire space of the housing 13 on the left side of the partition 27, as shown in FIGS. 1 and 2.

A depression 31 locates in the base top 25 within the inlet chamber 29. An inlet 33 extends through the depression 31. Inlet 33 connects to a line 35 which leads to a faucet (not shown) for supplying water. A screen 37 of preferably 100 mesh locates over the depression 31 for filtering liquid flowing in through the line 35.

The inlet chamber 29 is filled with a metallic particulate 39. The metallic particulate 39 comprises metal particles which create an ion exchange with inorganic material. Metallic particulate 39 removes traces of heavy metals from the water. One type of metallic particulate 39 that is suitable is described in U.S. Pat. No. 4,642,192. Metallic particulate 39 fills about three-fourths of the inlet chamber 29. The remaining space is open.

Port means comprising a plurality of horizontal slots 41 extend through the partition 27 near the top 17. The slots 41 preferably will be located above the upper level of the metallic particulate 39. The slots 41 are small enough to block any of the metallic particles 39 from flowing out of the inlet chamber 29.

An outlet chamber 43 comprises the space in the housing 13 on the right side of the partition 27. Outlet cheer 43 is of the same dimension as the inlet chamber 29. It is filled with an activated granular charcoal material 45. It will be filled completely to the top preferably.

A depression 47 is formed in the base top 25. An outlet 49 connects to a line 51. Line 51 will lead back to the water faucet for distribution of the filtered water. A screen 53 of a finer mesh than the screen 37 locates on top of the depression 47. Screen 53 is preferably of 200 mesh, and thus has holes that are smaller than screen 37.

In operation, when the user opens a valve (not shown) at the faucet, water will flow through the line 35 into the inlet chamber 29. The water will flow upward through the metallic particulate 39. The metallic particulate 39 will remove inorganic impurities from the water. The upward flow of the water causes the particles 39, which are irregularly shaped, to move around and flow upward to some extent. This upward movement increases the surface area of the particles 39 over which the water flows. This upward flow reduces compaction which might occur if the water were flowing downward. Some of the particles will suspend in the upward flowing liquid, preventing cementation of the particles 39.

The water will flow through the slots 41 into the outlet chamber 43. The water will flow downward through the granulated charcoal 45. The downward flow increases the compaction of the charcoal 45. This assures minimum space between the particles, which increases the filtering capability of the charcoal 45. The cross sectional area of the outlet cheer 43 increases from the top to the base 19 because of the conical contour of the housing side walls 15. This increase in flow area slows the water flow rate as it reaches the outlet screen 53. The water will flow through the outlet 49 and line 51 to a tap for filling a container.

Figure 3:
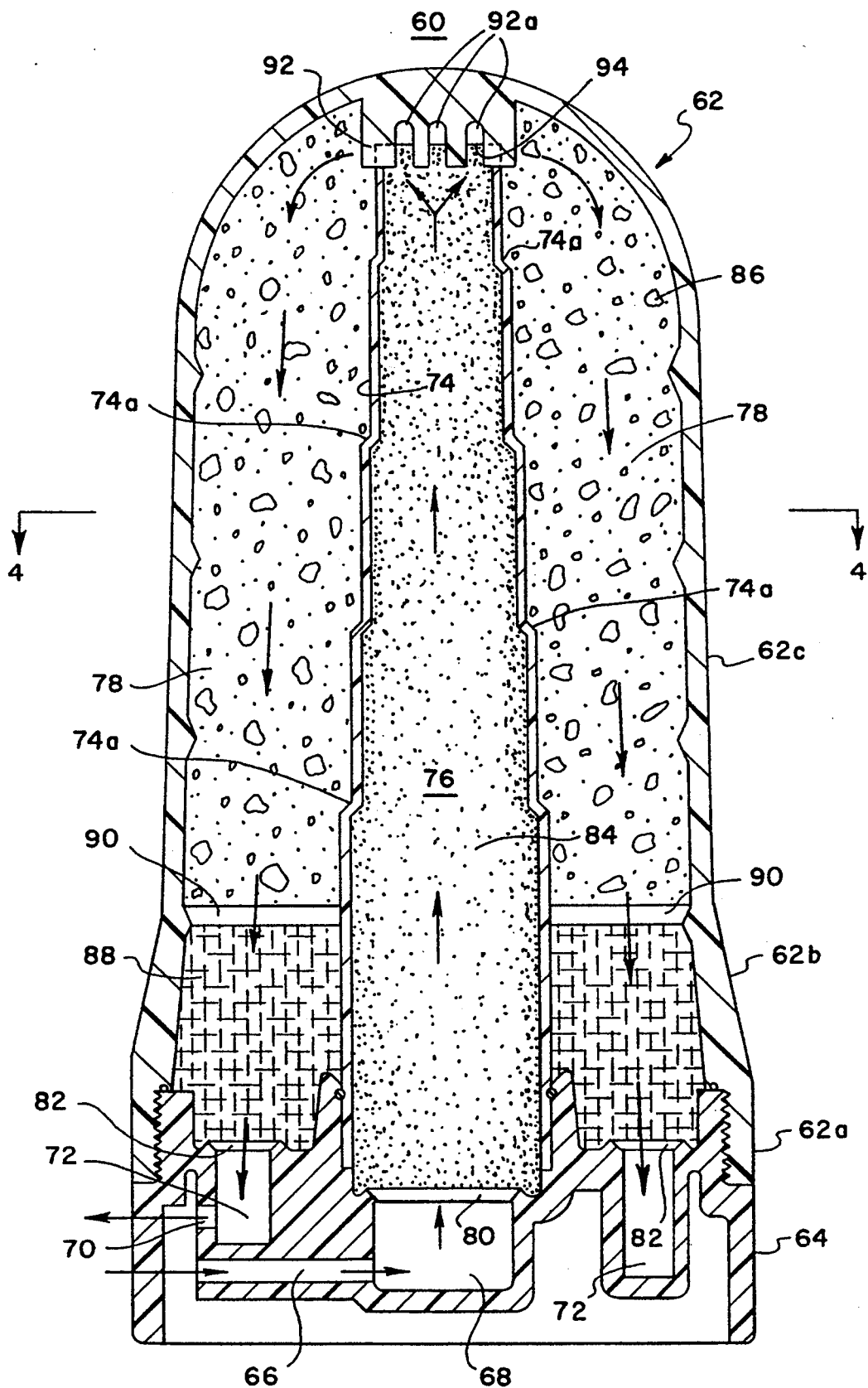
FIG. 3 is a vertical sectional view of an alternate embodiment of a filter constructed in accordance with this invention.
Figure 4:
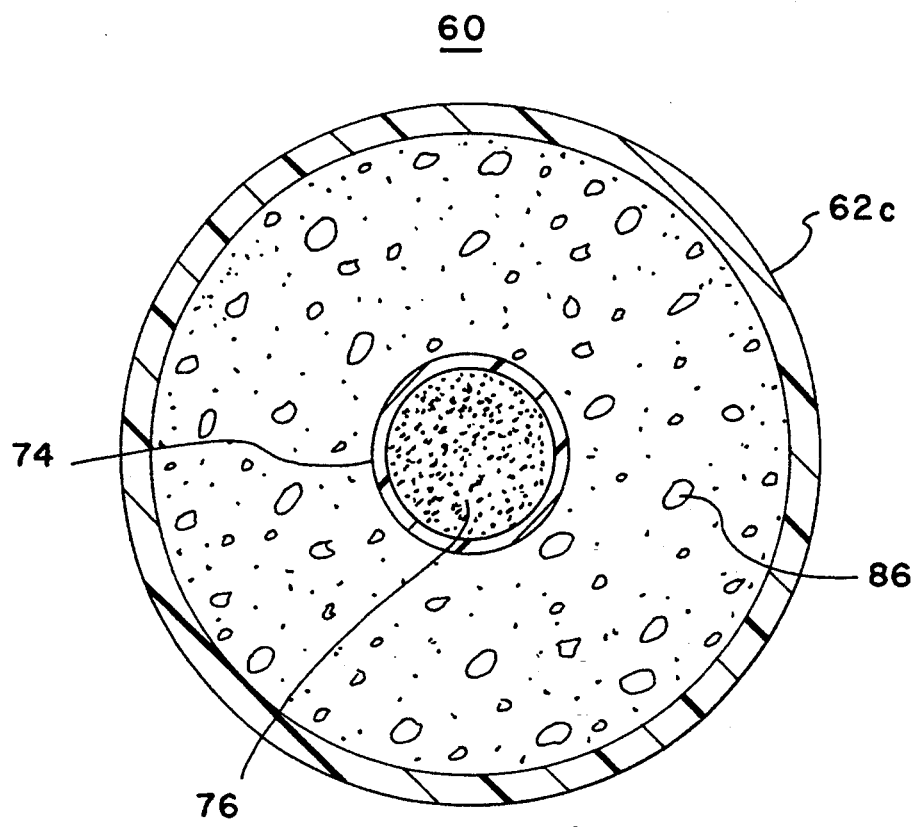
FIG. 4 is a horizontal sectional view of the filter of FIG. 3, taken along the lines 4—4 of FIG. 3.

Referring to FIGS. 3 and 4, an alternate embodiment of a filter 60, according to the present invention, is depicted. Filter 60 includes a housing 62, which has a substantially cylindrical bottom portion 62a, a tapered intermediate portion 62b and a substantially cylindrical top portion 62c. Intermediate portion 62b is preferably in the shape of a truncated cone, tapering upwardly and inwardly from bottom portion 62a. Bottom portion 62a is threaded on an internal surface thereof for engaging complementary threads on a external surface of a base 64, to locate housing 62 with respect to base 64. Top portion 62c is rounded to define a substantially dome-shaped top.

Base 64 includes an inlet line 66 in fluid communication between a water source, such as a faucet (not shown) and an inlet accumulator 68. Base 64 also contains an outlet line 70, which is in fluid communication between the water source (e.g., the faucet) and an outlet accumulator 72.

A substantially cylindrical partition 74 extends substantially the entire height of housing 62 for dividing the interior of housing 62 into an inlet chamber 76 and an outlet chamber 78. Inlet chamber 76 is substantially cylindrical and outlet chamber 78 is an annular chamber surrounding inlet chamber 76 and in co-axially relationship therewith. A screen 80, which is preferably of 100 mesh, is located between inlet accumulator 68 and inlet chamber 76 for filtering liquid flowing into inlet chamber 76. A screen 82 is located between outlet accumulator 72 and a bottom part of outlet chamber 78. Screen 82 is preferably a screen of 100 mesh.

Inlet chamber 76 is preferably filled with a metallic particulate 84. Metallic particulate 84 comprises metal particles which create an ion exchange with inorganic material. Metallic particulate 84 removes traces of heavy metals from the water. Metallic particulate 84 is comprised of inorganic minerals, such as copper and zinc, for removal of chlorine, lead, mercury, arsenic and other dissolved metals by ionic adsorption and catalytic oxidation. Metallic particulate 84 is preferably a relatively high density metallic particulate.

Outlet chamber 78 contains two different types of filter media. A lower portion of outlet chamber 78 is filled with a filter media 88 containing a blend of high grade activated carbons, including bituminous and coconut shell carbons. The carbons are blended for the reduction of organic chemicals, herbicides, pesticides and industrial solvents.

The filter media 86 contained in an upper portion of outlet chamber 78 is comprised of a ceramic impregnated carbon media for enhanced reduction of dissolved metals and volatile organic chemicals. Filter media 86 includes a highly advanced ceramic matrix media, which bonds dissolved metals internally and irreversibly in a matrix pore structure. A partition 90 is located between filter media 86 and filter media 88 in outlet chamber 78.

A port 92 is located at the top of inlet chamber 76. Port 92 includes a plurality of radially extending slots 92a for directing liquid flowing from inlet chamber 76 through port 92, radially outward into outlet chamber 78. A plastic screen 94 is located at the top of inlet chamber 76. Screen 94 has a sufficiently fine mesh to prevent metal particles of metallic particulate 84 from escaping into outlet chamber 78.

In operation, when a user opens a valve (not shown) at the water source (e.g., the faucet), water will flow through inlet line 66 and inlet accumulator 68 into inlet chamber 76. Metallic particulate 84 removes inorganic impurities from the incoming water. Water flows upwardly through inlet chamber 76, as indicated by the upwardly directed arrows in FIG. 3. The upward flow of the water causes the metallic particulate 84, which is comprised of irregularly shaped metal particles, to move around and flow upward to some extent. This upward movement increases the surface area of the metal particles over which the water flows. The upward flow also reduces compaction, which might occur if the water were flowing downward. Some of the metal particles will suspend in the upwardly flowing water, thereby preventing cementation of the metal particles.

Partition 74 includes a plurality of tapered portions 74a, spaced vertically along partition 74. Tapered portions 74a are tapered inwardly and upwardly for directing the water flow toward the center of inlet chamber 76. As can be best seen in FIG. 3, partition 74 is defined by a series of substantially cylindrical portions, punctuated by tapered portions 74a, such that the diameter of inlet chamber 76 decreases slightly between base 64 and port 92. Tapered portions 74a force the upwardly flowing water inwardly for increased contact with metallic particulate 84.

As the upwardly flowing water reaches port 92 at the top of inlet chamber 76, the water is distributed radially outwardly into outlet chamber 78. The water flows downwardly through outlet chamber 78, as indicated by the downwardly flowing arrows in FIG. 3. The downward water flow increases the compaction of filter media 86, which results in minimum space between media particles, thereby increasing the filtering capability of filter media 86.

Water flowing through partition 90 into the lower portion of outlet chamber 78 is filtered by filter media 88. The cross-sectional area of outlet chamber 78 increases downwardly in the region where sorbent media 88 is located. This increase in flow area slows the water flow rate as it reaches outlet screen 82. The filtered water flows through outlet screen 82, outlet accumulator 72 and into outlet line 70 to a tap (not shown) for filling a container.

The invention has significant advantages. The two separate cheer prevent mixing of one filtration material with another. The vertical partition enables one filter material to have an upward flow and the other to have a downward flow. The filtration material which operates best with an upward flow can be located in the inlet chamber, while the outlet chamber can hold the filtration material that operates best with the downward flow.

While the invention has been shown in two of its forms, it should be apparent to those skilled in the art that it is not so limited, but is susceptible to various changes without departing from the scope of the invention.

We claim:

1. A liquid filter, comprising, in combination:
    a housing having a bottom and a top;
    a substantially vertical partition located in said housing, dividing said housing into an inlet chamber and an outlet chamber;
    first filtration media located in said inlet chamber;
    second filtration media located in said outlet chamber;
    inlet means located in said bottom of said housing in said inlet chamber for receiving liquid to be filtered and for causing the liquid to flow upwardly through said first filtration media so as to reduce compaction thereof;
    port means adjacent said top of said housing, for causing the liquid flowing upwardly through said inlet chamber to flow from said inlet chamber into said outlet chamber; and
    outlet means located in said bottom of said housing in said outlet chamber, for causing liquid flowing into said outlet chamber from said inlet chamber to flow downwardly through said second filtration media so as to increase compaction of said second filtration media and out of said housing.

2. The filter of claim 1 wherein said inlet chamber is in co-axial relationship with said outlet chamber, with said outlet chamber surrounding said inlet chamber.

3. The filter of claim 2 wherein said port means includes means for directing liquid flowing through said port means outwardly from said inlet chamber into said outlet chamber.

4. The filter of claim 1 further including third filtration media located in said outlet chamber adjacent said bottom of said housing, said third filtration media including media for removing dissolved metals from the liquid.

5. The filter of claim 1 wherein said first filtration media includes a metallic particulate for removing inorganic particles from the liquid.

6. The filter of claim 1 wherein said second filtration media includes activated carbon.

7. The filter of claim 1 wherein said partition is comprised of a plurality of substantially cylindrical portions, punctuated by a corresponding plurality of substantially conical portions to define a substantially cylindrical inlet chamber, a cross-sectional area of said inlet chamber decreasing from said bottom to said top.

8. A liquid filter, comprising, in combination:
    a housing having a bottom and a top;
    a substantially vertical partition located in said housing, dividing said housing into an inlet chamber and an outlet chamber, said inlet chamber being in co-axial relationship with said outlet chamber, with said outlet chamber surrounding said inlet chamber, said partition including a plurality of substantially cylindrical portions, punctuated by a corresponding plurality of substantially conical portions, such that a cross-sectional area of said inlet chamber decreases from said bottom to said top;
    first filtration media located in said inlet chamber, said first filtration media including a metallic particulate for removing inorganic particles from the liquid;
    second filtration media located in an upper portion of said outlet chamber, said second filtration media including charcoal for filtering organic material from the liquid;
    third filtration media located in a lower portion of said outlet chamber, said third filtration media including ceramic impregnated sorbent media for removing dissolved metals from the liquid;
    inlet means located in said bottom of said housing in said inlet chamber for receiving liquid to be filtered and for causing the liquid to flow upwardly through said first filtration media so as to reduce compaction thereof;
    port means adjacent said top of said housing, for directing the liquid flowing upwardly through said inlet chamber outwardly into said outlet chamber; and
    outlet means located in said bottom of said housing in said outlet chamber, for causing liquid flowing into said outlet chamber from said inlet chamber to flow downwardly through said second filtration media and said third filtration media so as to increase compaction of said second filtration media and said third filtration media and out of said housing.

* * * * *